Patented June 19, 1923.

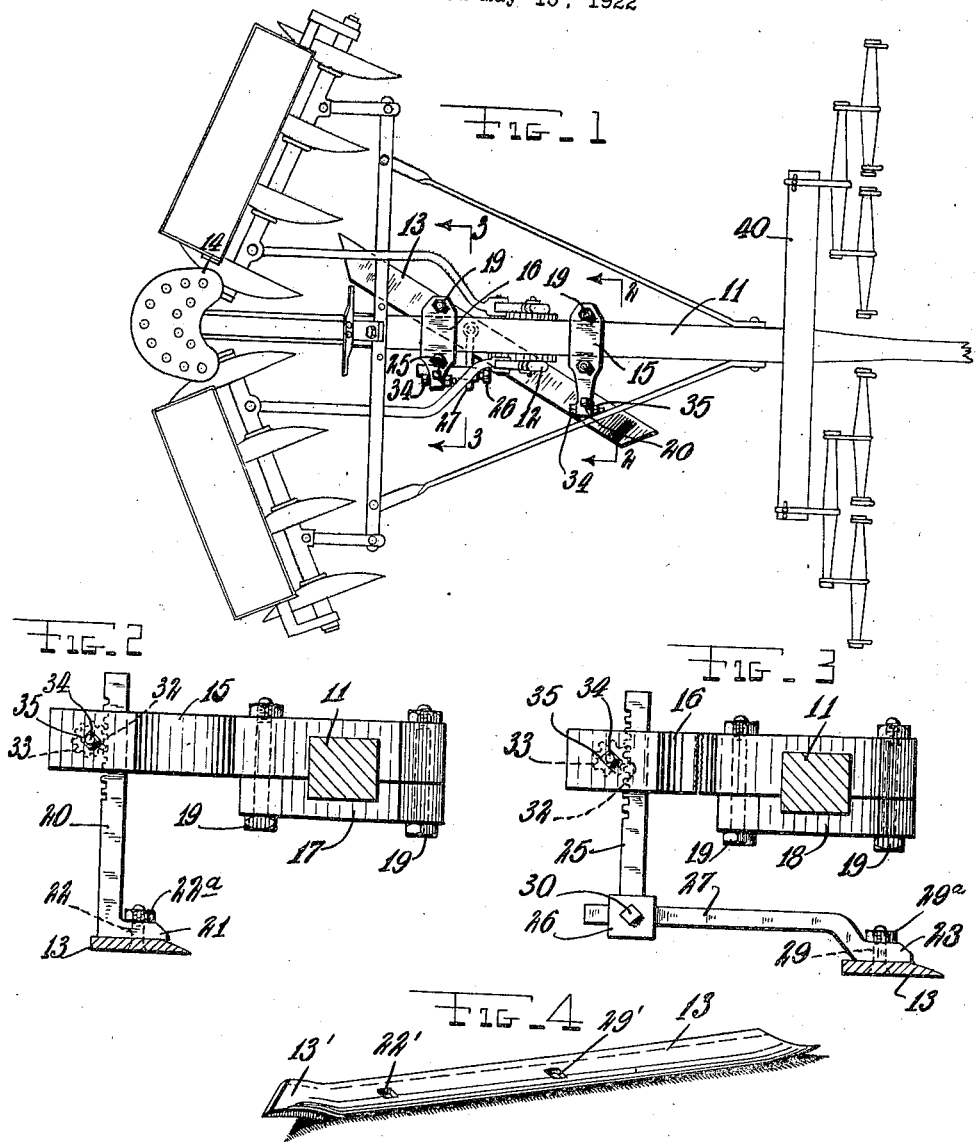

1,459,256

UNITED STATES PATENT OFFICE.

ANDRES RAMIREZ, OF GUADALUPE, TEXAS.

COMBINATION COTTON CULTIVATOR.

Application filed May 15, 1922. Serial No. 561,083.

*To all whom it may concern:*

Be it known that I, ANDRES RAMIREZ, citizen of the United States, residing at Guadalupe, in the county of Victoria and State of Texas, have invented certain new and useful Improvements in Combination Cotton Cultivators, of which the following is a specification.

This invention relates generally to agricultural implements, having more particular reference to a combination implement adapted for use in preparing the land for planting cotton.

The invention has for an object to provide a simple and efficient combination implement for use in preparing the ground and which acts to sever the old stalks and chop the same up, combining preferably both a disk harrow and a stalk cutter.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of my improved agricultural implement.

Fig. 2 is a detail transverse section on the line 2—2 of Fig. 1.

Fig. 3 is a detail transverse section on the line 4—4 of Fig. 1.

Fig. 4 is a detail perspective view of the knife.

As here embodied my improved agricultural implement comprises a plurality of transversely spaced harrow disks connected in the usual manner to a central pole 11, the adjusting levers for the disks being indicated at 12, the driver's seat on the rear end of the pole being indicated at 14.

As shown in Fig. 1 the harrow disks 10 have a considerable spacing at the centre of the machine, an obliquely arranged cutting knife 13 being extended across this space, this knife being carried by the pole 11. As here shown a pair of transverse arms 15 and 16 are clamped upon the pole 11 by means of complementary clamping plates 17 and 18 bolted thereto as at 19, these arms 15 and 16 being located respectively at front and rear of the levers 12.

The outer end of arm 15 is provided with a suitable vertical aperture to receive a downwardly extending rod 20, secured thereto by means to be presently described.

The lower end of this rod 20 has a horizontal foot 21 to the underside of which the knife 13 is secured, as by a bolt 22 having a frusto-pyramidal head engaged in a like aperture 22' in the knife 13, the bolt having a nut 22ª on its upper end, a knife being in the form of a straight blade of considerable length, the rod 20 connecting to the knife near the front end of the latter, which is upturned as at 13'.

The outer end of the other arm, 16, is provided with a suitable vertical aperture to receive a downwardly extending rod 25 having a rigid forwardly extending offset 26 on its lower end. This offset 26 is formed with a suitable transverse aperture to slidably receive an inwardly extending arm 27 having a downwardly offset inner end 28 to which the knife is secured by a bolt 29 similar to the bolt 22 and passing upward through an opening 22' in the knife 13 and having a nut 29ª on 29' upper end. The arm may be adjustably secured to the offset 26 by a set screw 30. The rods 20 and 25 are here shown as formed with rack teeth 32 with which engage pinions 33 fixed on bolts 34 rotatable in the ends of the arms and provided with lock nuts 35. When the nuts are loosened the pinions 33 may be rotated to adjust the rods 20 and 25 and so vary the height of the knife from the ground.

My improved machine is drawn along the ground in the manner of an ordinary harrow, the pole 11 being adapted to have the usual draft gear indicated at 40, attached thereto. I may also couple up with the machine a double plow, the two shares whereof are indicated at 41, so that with my improved implement I can cut the stalks of cotton, chop them, and plow up the soil to turn them under, all at the same time.

While I have illustrated and described a preferred embodiment of my invention it is to be understood that I do not limit myself to the precise construction shown, and that various changes and modifications might be made therein without departing from the spirit and scope of the invention as defined in the appended claims.

Having thus described my invention what I claim as new and desire to protect by Letters Patent of the United States is as follows:

1. An agricultural implement of the type set forth comprising a central pole, a pair of transverse arms removably clamped upon said pole and spaced longitudinally thereof, vertical rods extending through apertures in the outer ends of said arms, rack teeth formed on said rods, gear pinions engaging said rack teeth, bolts rotatable in said arms having said pinions fixed thereon, nuts threaded on said bolts adapted to lock the same against rotation by binding on said arms, a transversely adjustable arm carried by the lower end of one of said rods, and an obliquely arranged knife supported by the said transversely adjustable arm and the lower end of the other of said vertical rods.

2. An agricultural implement of the type set forth comprising a centre pole, a pair of transverse arms fixed to said pole and spaced longitudinally thereof, rods carried by the outer ends of said arms and adapted for vertical adjustment, and an obliquely arranged knife supported by said rods.

3. An agricultural implement of the type set forth comprising a centre pole, a pair of transverse arms fixed to said pole and spaced longitudinally thereof, rods carried by the outer ends of said arms and adapted for vertical adjustment, and an obliquely arranged knife supported by said rods, one of said rods carrying a transversely adjustable arm to which said knife is secured to permit of variation of its oblique angle.

In testimony whereof I have affixed my signature.

ANDRES RAMIREZ.